(12) United States Patent
Wisner

(10) Patent No.: US 6,262,133 B1
(45) Date of Patent: Jul. 17, 2001

(54) PROCESS FOR REMOVING DELETERIOUS SURFACE MATERIAL FROM POLYMERIC REGRIND PARTICLES

(75) Inventor: Ralph Wisner, Midland, MI (US)

(73) Assignee: American Commodities, Inc., Flint, MI (US)

( * ) Notice: Subject to any disclaimer, the term of this patent is extended or adjusted under 35 U.S.C. 154(b) by 0 days.

(21) Appl. No.: 09/268,832

(22) Filed: Mar. 16, 1999

Related U.S. Application Data

(60) Provisional application No. 60/078,095, filed on Mar. 16, 1998.

(51) Int. Cl.⁷ .................................................. C08J 11/00
(52) U.S. Cl. ............................................ 521/40; 521/405
(58) Field of Search .................... 521/40, 40.5, 47, 521/48; 523/400; 525/208, 391, 394, 396

(56) References Cited

U.S. PATENT DOCUMENTS

| | | |
|---|---|---|
| 2,284,142 * | 5/1942 | Gray ........................................ 260/86 |
| 3,551,943 | 1/1971 | Staton et al. . |
| 3,562,373 | 2/1971 | Logrippo . |
| 3,567,815 | 3/1971 | Frank . |
| 3,608,001 | 9/1971 | Kowalski . |
| 3,652,466 | 3/1972 | Hittel et al. . |
| 3,687,873 | 8/1972 | Kropscott et al. . |
| 3,976,730 | 8/1976 | Cushing . |
| 4,051,212 | 9/1977 | Grigat et al. . |
| 4,063,860 | 12/1977 | Cushing . |
| 4,065,532 | 12/1977 | Wild et al. . |
| 4,098,649 | 7/1978 | Redker . |
| 4,138,534 | 2/1979 | Tedesco . |
| 4,139,309 | 2/1979 | Billingsley . |
| 4,212,774 | 7/1980 | Idel . |
| 4,244,903 | 1/1981 | Schnause . |
| 4,448,737 | 5/1984 | Johnson . |
| 4,602,046 | 7/1986 | Buser et al. . |
| 4,619,706 * | 10/1986 | Squired et al. ........................... 134/2 |
| 4,707,514 | 11/1987 | Katsuki et al. . |
| 4,900,156 | 2/1990 | Bauer . |
| 4,968,463 | 11/1990 | Levasseur . |
| 4,970,043 | 11/1990 | Doan et al. . |
| 4,983,648 | 1/1991 | Laughner et al. . |
| 5,122,398 | 6/1992 | Seiler et al. . |
| 5,145,617 | 9/1992 | Hermanson et al. . |
| 5,165,941 | 11/1992 | Hawley . |
| 5,176,861 | 1/1993 | Ishikawa . |
| 5,177,146 | 1/1993 | Scobbo, Jr. et al. . |
| 5,214,072 | 5/1993 | Fennhoff et al. . |
| 5,215,625 | 6/1993 | Burton . |
| 5,225,130 | 7/1993 | Deiringer . |
| 5,232,515 * | 8/1993 | Sullivan ................................. 134/38 |
| 5,253,994 | 10/1993 | Zweig et al. . |
| 5,340,839 * | 8/1994 | Gillette et al. ......................... 521/40 |
| 5,414,021 | 5/1995 | Eddy . |
| 5,424,013 | 6/1995 | Lieberman . |
| 5,443,772 | 8/1995 | Inoue et al. . |
| 5,476,624 | 12/1995 | Sato et al. . |
| 5,569,713 | 10/1996 | Lieberman . |
| 5,578,135 * | 11/1996 | Lohr et al. ................................ 134/7 |
| 5,817,183 | 10/1998 | Eddy-Helenek et al. . |
| 5,840,772 * | 11/1998 | Peters et al. ........................... 521/41 |

FOREIGN PATENT DOCUMENTS

| | | |
|---|---|---|
| 35 11 711 | 3/1985 | (DE) . |
| 40 33 862 A1 | 4/1992 | (DE) . |
| 41 05 285 A1 | 8/1992 | (DE) . |
| 430199A2 | 6/1991 | (EP) . |
| 1 445 168 | 8/1976 | (GB) . |
| 53-25677 | 3/1978 | (JP) . |
| 55-140528 | 11/1980 | (JP) . |
| 0 547 249 A1 | 3/1992 | (JP) . |
| 7810978 | 5/1980 | (NL) . |

* cited by examiner

*Primary Examiner*—Edward J. Cain
*Assistant Examiner*—Katarzyna Wyrozebski
(74) *Attorney, Agent, or Firm*—Young & Basile, PC

(57) ABSTRACT

A process for removing deleterious surfaces from polymeric regrind particles in which the polymeric regrind particles such as TPO, PC/ABS, PC/PBT, PA/PP or PA/PPO having a surface material deleterious to post-treatment processes is contacted by an aqueous attritive environment for an interval sufficient to accomplish dissociation of the deleterious surface material from contact with the polymeric regrind particulate substrate and removal of less than 10% of the total mass of polymeric regrind particulate substrate. After sufficient contact between the attritive environment and the polymeric regrind particles, the polymeric regrind particulate substrate is separated from the attritive environment and the retained dissociated deleterious surface material.

30 Claims, 5 Drawing Sheets

PROCESS FOR REMOVING DELETERIOUS SURFACE MATERIAL FROM POLYMERIC REGRIND PARTICLES

CROSS-REFERENCE TO RELATED APPLICATION

This application claims the benefit of U.S. Provisional Application Serial No. 60/078,095, filed Mar. 16, 1998.

BACKGROUND OF THE INVENTION

The invention relates, in general to processes for recycling thermoplastic material. This invention also relates to processes for rendering scrap thermoplastic suitable for reprocessing and reuse. More particularly, the present invention relates to a method for removing deleterious surfaces such as paint, UV oxidation, etc. from particulate thermoplastic material.

Plastic materials of all types have found many uses in a large number of consumer products. However, such widespread use of plastics has created problems relating to the disposal of plastic consumer products after their useful life. In addition to used consumer products, waste parts, bad parts, scrap, runners, spurs, purgings, etc. generated from plastic manufacturing processes must also be disposed of in an appropriate manner.

Currently, plastic materials are incinerated or buried in landfills. A small percentage of the plastic materials produced are inherently biodegradable in landfills or rendered so through manufacturing modifications. Currently, only a small portion of plastic materials are recycled. Incineration obviously creates a potential environmental problem and is particularly disfavored. Available landfills are reaching capacity and few new landfills are available. This problem is exacerbated as the use of plastic increases and the amount of land available for landfills decreases. With regard to biodegradable plastics, a very low percentage of such plastics are significantly biodegradable. Furthermore, biodegradable plastic materials are extremely costly to manufacture and employ.

Various plastics recycling processes have been proposed, including the process disclosed in U.S. Pat. No. 5,424,013 to Lieberman. In the Lieberman process, thermoplastic to be recycled is ground into particulate form, tested and analyzed and provided with appropriate formulation enhancers and modifiers to adjust any differences in the properties of the recycled material to those properties generally found in virgin thermoplastic. In the Lieberman process, defective thermoplastic parts which have been painted, for example, auto parts and the like, can be granulated and extruded through a devolatilizing extruder. Paint specks remain visible in the processed specimen. Sufficient concentrations of very small paint specks in parts made of reclaimed plastic can give a flawed appearance, and potentially, reduce important physical properties of the plastic material, thereby adversely affecting the overall performance of the finished part.

Various attempts have been made to separate deleterious surface coatings such as paint from polymeric substrate. Processes such as the one disclosed in U.S. Pat. No. 5,340, 839 to Gillette are directed toward a method in which articles composed of essentially homogeneous polycarbonate material coated with a scratch-resistant coating are treated with moderate agitation in a solution containing a water-miscible alcohol. The treatment solution employed also contains between about 5% and about 40% alkali metal hydroxides. The thermoplastic material is exposed to the alkaline solution for a period of approximately 20 to 60 minutes with sufficient agitation to provide contact with the surface treated thermoplastic substrate. It is believed that the water-miscible alcohol acts as a co-solvent with the water to penetrate the scratch-resistant surface treatment coating.

U.S. Pat. No. 5,578,135 issued to Löhr et al. discloses a chemo-mechanical stripping of paint from plastic parts. This reference wets the plastic chips with a stripping agent consisting of an anhydrous alkalified glycol, but in no way suspends the chips in the chemical(s). The chips and chemical(s) are then tumbled in a free-fall mixer, a positive mixer, or a rotary mixer to strip the softened/swelled paint from the. The reference also states that it is preferred to include stainless steel abrasive particles in the mixer with the chips.

As can readily be appreciated, extensive exposure to caustic solutions with or without the organic co-solvent can have deleterious effects on various types of underlying thermoplastic substrate materials. Thus, it is desirable, and an object of the present invention, to provide a method for removing undesirable deleterious surface material from various polymeric regrind particles in a manner which is both efficient and effective. Furthermore, it is desirable that the method for removing deleterious surface material from polymeric regrind particles be one which will deter redeposition of the removed particles on the surface of the regrind particles. Furthermore, it is desirable that the process for removing deleterious surfaces from regrind particles be one which permits the use of both mechanical and chemical action to effect removal of the deleterious surface to provide thermoplastic material which can be successfully employed in various post treatment processes. Finally, it is also desirable to provide a method which permits processing with a suitable compatibilizing agent, as necessary, to provide a reclaim thermoplastic material having suitable properties to act as a substitute for virgin material in various applications.

SUMMARY OF THE INVENTION

The present invention addresses and solves the above-mentioned problems and meets the enumerated objects and advantages, as well as others not enumerated, by providing a process for removing deleterious surfaces from polymeric regrind particles, comprising the steps of:

contacting polymeric regrind particles having a surface material deleterious to post-treatment processes attached to a polymeric substrate with an attritive environment for an interval sufficient to accomplish removal of the deleterious surface material from contact with the polymeric regrind particulate substrate with concomitant removal of less than 10% of the total mass of the polymeric particulate regrind substrate, wherein the attritive environment comprises an aqueous fluid medium capable of permitting agitation of the polymeric regrind particles introduced in the attritive environment; and separating polymeric regrind particulate substrate from the attritive environment while retaining removed deleterious surface material therein.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1A:
FIG. 1A is a close up at 9× power of regrind particles after 2 hours of being subjected to the process of the present invention.
Figure 1B:
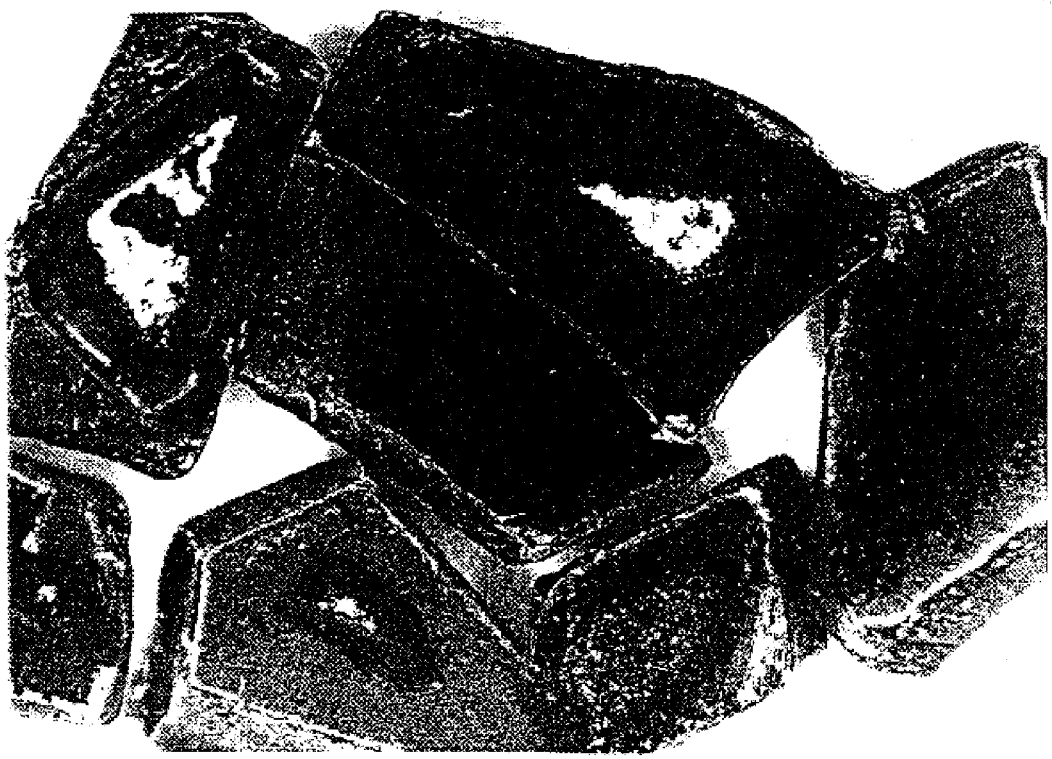
FIG. 1B is a close up at 9× power of regrind particles after 10 hours of being subjected to the process of the present invention.
Figure 1C:
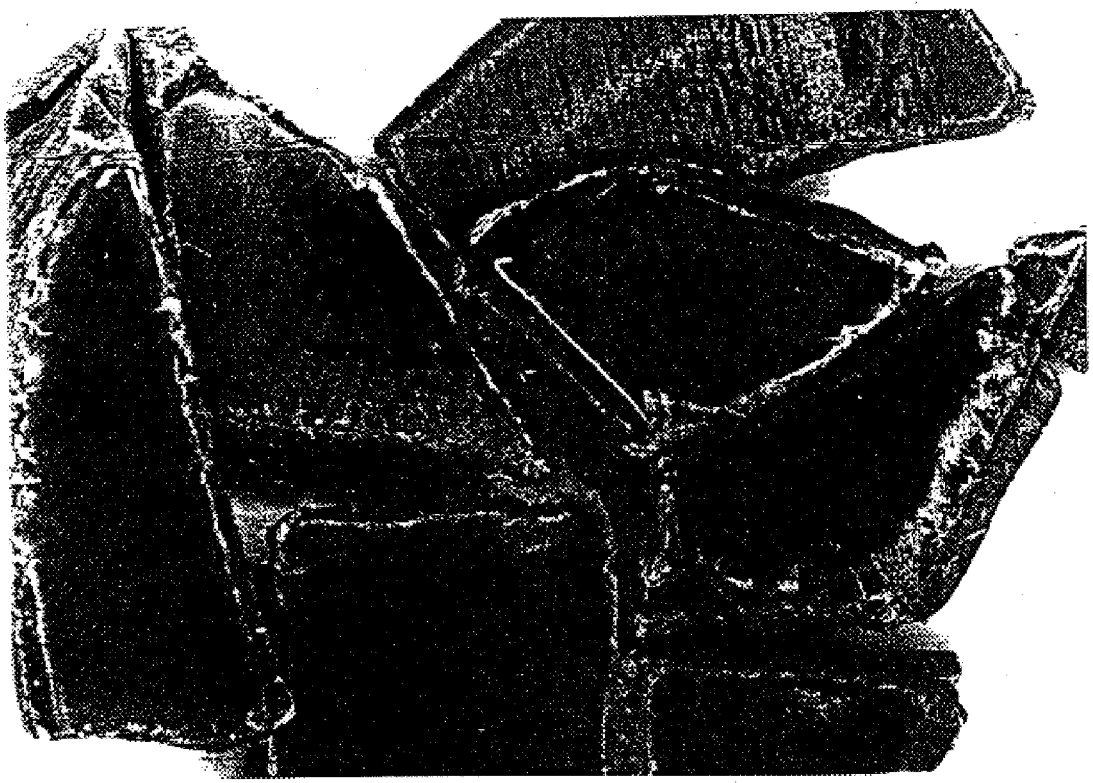
FIG. 1C is a close up at 9× power of regrind particles after 16.5 hours of being subjected to the process of the present invention.
Figure 1D:
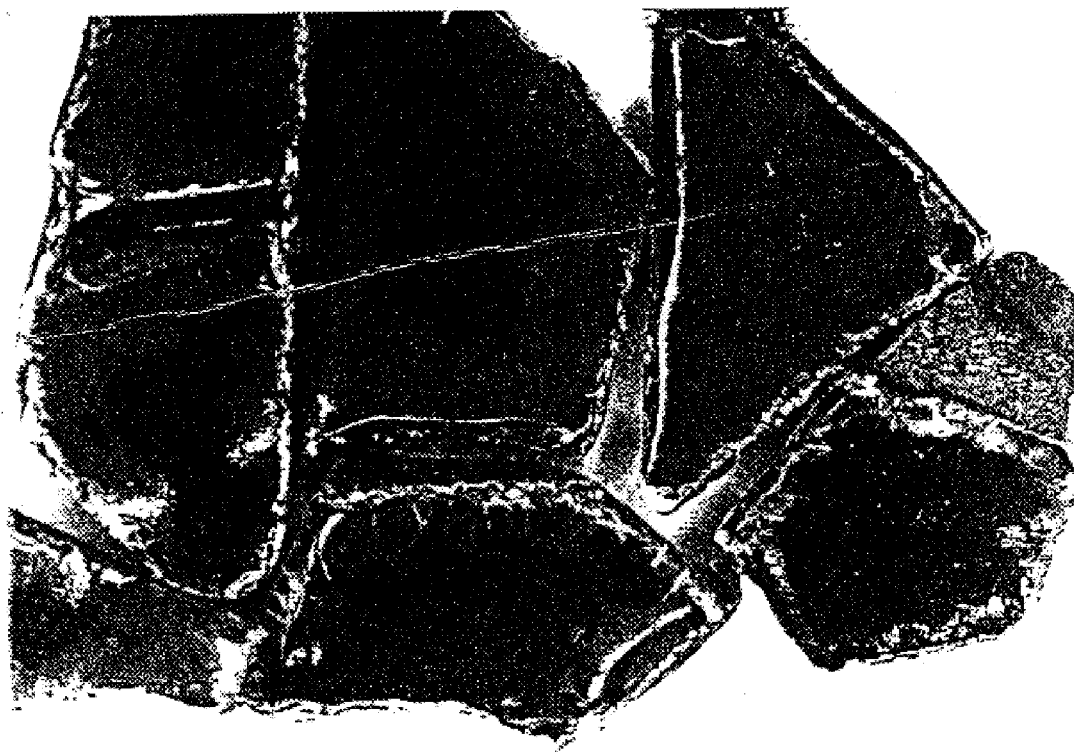
FIG. 1D is a close up at 9× power of regrind particles after 24 hours of being subjected to the process of the present invention.

The present invention is based upon the unexpected discovery that surface materials which can interfere with or impede post-treatment processing of recycled thermoplastic or which impair critical performance properties of the resulting recycled thermoplastic, herein referred to as "deleterious surface" can be removed from polymeric regrind particles through a process which includes surface attrition of the deleterious surface from the polymeric regrind particle. It has been found, quite unexpectedly, that the surface erosion to which polymeric regrind particles are subjected in the attritive environment of the process of the present invention permits removal of deleterious surfaces from polymeric regrind particles which heretofore were considered non-removable or removable only with undesirable degradation of the polymeric regrind particle substrate. Quite unexpectedly, it has been discovered that the process of the present invention permits the removal of the deleterious surface from the particle substrate while minimizing erosion or degradation of the polymeric substrate itself. In the process of the present invention, preferably, no more than 10 of the mass of the polymeric regrind particle is lost or eliminated as a result. The resulting treated polymeric regrind particulate material can be of a quality which will yield molded parts with class A surfaces, as well as excellent low temperature toughness; or can be rendered so by additional optional process steps which will be discussed in greater detail subsequently.

The process of the present invention can be employed to process polymeric regrind particles composed of various thermoplastic substrates; particularly thermoplastic substrates not readily amenable to other conventional reprocessing techniques. In the process of the present invention, it is anticipated that the polymeric regrind particles will be composed of thermoplastic materials generally suitable for extrusion or injection molding applications. The regrind particles processible by the present invention have polymeric substrates generally referred to as engineered thermoplastics. These include, but are not limited to, alloys of various thermoplastics with polycarbonate, alloys of various thermoplastics with polyamides, as well as thermoplastic polyolefins (TPO's) and various homopolymers. Examples of alloys of thermoplastic polyesters and polycarbonate include polycarbonate/polybutylene terephthalate alloys (PC/PBT) polycarbonate/polyethylene terephthalate (PC/PET). Examples of alloys of various thermoplastic elastomers and/or thermoplastic rubbers and polycarbonate such as alloys of polycarbonate and acrylonitrile-butadiene-styrene (PC/ABS). Examples of alloys of polyamides and various polyolefins include polyamide/polypropylene (PA/PP), polyamide/polyphenylene oxide (PA/PPO), and the like. Examples of various TPO's include thermoplastic polyolefins modified by polypropylene/ethylene propylene diene. Examples of homopolymers which can be treated by the process of the present invention include polyamides, polystyrenes and polypropylene. Polymeric alloys such as virgin PC/PBT are those commercially available under the tradename XENOY from General Electric Corporation. Typical virgin polyamide/polyphenylene oxide blend materials are those commercially available under the tradename NORYL GTX, also commercially available from General Electric. TPO's are a major thermoplastic used in exterior body parts on various automobiles. Virgin TPO is available from a variety of sources.

The process of the present invention is specifically adapted to the treatment of recycled polymeric substrate in the form of polymeric regrind particles. As used herein the term "polymeric regrind particles" are recovered granulated polymeric material which can be derived from a variety of sources. Specific particle size and polymeric content can vary from regrind type to regrind type. However, it is anticipated that polymeric regrind material can be derived from sources such as internal scrap which is generally referred to as post-industrial material and from scrap derived from dismantlers generally referred to as post-consumer material. It is to be understood that materials processed by the method of the present invention are generally segregated by type prior to deleterious surface removal. This increases post-treatment processing ease and efficiency. However, while this is preferred, it is also within the purview of this invention to process non-homogeneous polymeric regrind material as desired or necessary.

The polymeric regrind particles employed in the present invention can be produced by any suitable grinding operation. As such, they can be regularly or irregularly shaped particles. The average particle size suitable for use in the process is that amenable to treatment in the attritive environment of the present invention. Average particle sizes are generally between about ¼" and about ¾", with average particle sizes between about ⅜" and about ⅝" being preferred.

In such particle size ranges, it is possible to remove essentially all deleterious surface material as a result of exposure to the attritive environment of the present invention. This can be accomplished without unduly eroding or removing significant quantities of the underlying polymeric substrate and without compromising polymer performance. It is to be understood that larger sized particles can be employed in situations in which total or essentially total removal of the deleterious surface material is not required or sought.

The term "deleterious surface" as used herein is generally defined as materials existing on, at, or proximate to the surface of the polymeric regrind particles which, if left in place, would interfere with polymer reprocessing procedures or with the ultimate performance of the reprocessed material. The deleterious surface may include chemical coating materials imparted during original production processes which are attached to or overlay at least a portion of the surface of the polymeric regrind particle. Examples of these typically include paints, lacquers and various adhesives or bonding agents. The deleterious surface may also consist of surface modification agents such as adhesion modifiers which are present in the outermost region of the polymeric regrind particles. The deleterious surface may also be the result of physical changes in the surface regions of the original material such as cross-linking as a result of corona discharge treatment, plasma discharge treatment, and the like. Such physical changes can also be the result of natural processes which occur during the useful life of the polymeric part such as UV degradation and the like.

Paints which can be effectively removed by the process of the present invention include, but are not limited to, various cross-linked paint materials such as thermosetting or UV-curing paints in which the primary binder is polyester or polyacrylate cross-linked with a suitable cross linking agent such as a urethane-based material; such as hexamethylene diisocyanate or various melamine formaldehydes. The removal of non-cross-linked, air drying paints is also considered within the scope of this invention.

In the present invention, it is preferred that the process proceed until any residual deleterious surface material retained on the particulate polymeric substrate at the end of the attrition process be very small. It is also important that any particulate material retained on the surface of the polymeric substrate be of a size at or below the size generally defined as a size acting as a stress concentrator during impact testing without impairing critical physical performance of the reprocessed polymeric material. It is to be understood that performance impairment of the polymer can be due to surface imperfections caused by foreign material such as dirt, paint particles, or the like embedded at or near the surface. This results in aesthetic shortcomings and can impede subsequent paint performance. Performance impairment can also be due to foreign material such as paint particles embedded within the body of the polymer. These particles can act as stress concentrators for the initiation and propagation of fractures and the like.

In the process of the present invention, polymeric regrind particles composed of the desired polymeric substrate material are brought into contact with an attritive environment for an interval sufficient to remove the deleterious surface material from contact with the desired polymeric substrate. This occurs with the concomitant removal of less than about 10% of the total mass of the desired polymeric substrate.

The attritive environment of the present invention is a medium for conveying mechanical agitative energy. The attritive environment is composed of a fluid phase which promotes mechanical erosion as well as fluid force erosion of the deleterious surface material and its removal from the desired polymeric substrate. The erosion process incrementally exposes the desirable polymeric substrate of the particulate material. The attritive environment may also include various chemical additives. The chemical additives employed may variously facilitate removal of the deleterious surface material, assist in sequestration of the deleterious surface material, and/or convert at least a portion of the deleterious surface material into a substance which can be integrated into reprocessed polymeric material.

The attritive environment of the present invention includes means for suitably fluidizing/suspending the polymeric regrind particles, thereby forming a slurry, during at least a portion of the removal process. In the preferred embodiment, the fluidizing means is a liquid medium which is either essentially non-reactive with the polymeric substrate material or, if slightly interactive, does not exert a deleterious effect on the polymeric substrate material. For purposes of economy, the liquid employed is water or an aqueous medium composed in large part of water. In a preferred embodiment, the fluidizing/suspending means consists essentially of water and a hydrolyzing agent(s), discussed further hereinbelow.

The attritive environment of the present invention can also include suitable chemical additives which will facilitate the removal of the deleterious surface. It is theorized that such additives can act upon the deleterious surface and/or the polymeric substrate to reduce the mechanical strength and/or adhesion existing between deleterious surface material and the substrate. Materials of choice act upon the particles either by swelling the deleterious surface material and/or by breaking chemical bonds existing in the deleterious surface material or existing between the deleterious material and the substrate.

Appropriate additives to the attritive environment which target chemical bonds associated with the deleterious surface material include various hydrolyzing agents. Hydrolyzing agents neutralize or attack various chemical bonds existing between the deleterious surface and the polymeric substrate of the regrind particle. Hydrolyzing agents can also be chosen for their ability to neutralize or attack various bonds existing in the deleterious surface itself. The hydrolyzing agents employed in the attritive environment are selected for their general aggressiveness toward the deleterious surface and general non-reactivity with the polymeric substrate.

It is preferred that hydrolyzing agents be chosen from strongly alkaline materials. In the preferred embodiment, basic hydrolyzing agents include alkali metal hydroxides selected from the group consisting of sodium hydroxide, potassium hydroxide, and mixtures thereof; and alkali metal phosphates selected from the group consisting of trisodium phosphate, disodium phosphate, and mixtures thereof.

The total concentration of hydrolyzing agent in solution is that sufficient to achieve attack and break down of the targeted chemical bonds so as to reduce the mechanical strength of the bond between the deleterious surface and the substrate and render the particles susceptible to treatment in the attritive environment, with concentrations between about 5% and about 25% by weight being preferred. In the process of the present invention, hydrolyzing agent is present in a concentration preferably between about 2% and about 20% by weight. Without being bound to any theory, it is believed that hydrolyzing agent(s) present in the attritive environment act on binder agents in deleterious surface materials, eg. paint, to initiate breaking of molecular bonds in the deleterious surface material. This renders the deleterious surface material highly susceptible to other mechanical and/or chemical attritive effects of the process environment.

Furthermore, it is believed that the hydrolyzing agent component of the attritive environment acts to reduce the interfacial adhesion or general attachment between the deleterious surface layer and to the underlying polymeric substrate. For example, in situations in which the polymeric regrind particles carry a top paint coat and an underlying tie coat, it is believed to be a combination of both actions which occurs. In such circumstances, the hydrolyzing agent renders regions susceptible to the continued action of mechanical erosion or attrition which, in turn, renders new regions of deleterious surface susceptible to attrition.

In addition to hydrolyzing agents, suitable swelling additives may be contained in the attritive environment. Swelling additives are water insoluble solvents which are selected from solubility parameters similar to the coating material which forms the deleterious surface material, ie. the deleterious surface material should have a predetermined and/or desired degree of solubility within the swelling agent(s). Any suitable swelling agent having the desired solubility parameters may be used, however, in the preferred embodiment, suitable swelling agents are selected from the group consisting of toluene, chlorinated solvents, benzene, and mixtures thereof.

Further, in an alternate embodiment, the polymeric particles may be contacted with the swelling agent(s) mentioned above as an initial step in the process; ie. before the particles are placed in the attritive environment. In this alternate embodiment, the attritive environment of choice is water.

In the preferred embodiment, the attritive environment can also include other chemical additives in addition to or instead of the aforementioned materials which reduce the bond strength. Suitable chemical additives can include emulsified solvents which serve to prevent redeposition of removed deleterious surface material onto the polymeric substrate. The additive material may also include concentrations of surfactant compounds in amounts sufficient to interact with removed deleterious surface materials (i.e., dissociated paint) and prevent redeposition onto the particulate polymeric regrind substrate.

If necessary and/or desired to render any remaining trace amounts of deleterious surface material(s) substantially non-deleterious in any subsequent re-manufacturing of the stripped polymeric particulate, the present inventive process may further comprise an in situ compatibilization step. Preferably, this step occurs separately from, and after the attritive step. The polymeric regrind particles may be preferably processed in the attritive environment in the presence of a suitable hydrolyzing agent for an interval sufficient to initiate hydrolysis and break down of the deleterious surface material (eg. paint). The partially stripped polymeric particles are then recovered, washed to remove residual hydrolyzing agent, and dried. The polymeric particles may then optionally be melt processed under standard mixing conditions with the addition of chemical additive(s) which form multi-functional compatibilizing agent(s).

The optional additive(s) include materials which inherently or interactively form in situ compatibilizers between dispersed deleterious surface material, eg. paint, and the polymeric substrate. The chemical additives contemplated would act on residual deleterious surface material, which is preferably already in a partially hydrolyzed state. The material which is formed is an in situ compatibilizer which redisperses the deleterious material into small particles or dispersant which interacts or reacts with the matrix polymer. This material can be added to the coating stripped regrind particle to produce a material which has critical physical properties at or sufficiently near those of virgin material.

It is believed that addition of the additive forming the compatibilizing agent during melt processing results in a reaction product between the paint and the compatibilizing agent which contains moieties compatible with both the paint phase and the polymeric substrate phase of the resulting processed material with relative solubility depending upon the molecular weight and chemical composition of each end of the resulting molecule.

The materials which may form suitable in situ compatibilizing agents in this invention are multi-functional reactants such as functionalized polypropylenes selected from the group consisting of maleic anhydride and norbornene-2,3-dicarboxcylic anhydride (NBDCA), etc., for TPO products. In the preferred embodiment, a 2% concentration of maleic anhydride grafted polypropylene is used. Polymers having epoxy functionalities selected from the group consisting of interpolymers of glycidyl methacrylate, methyl methacrylate, ethylene, and mixtures thereof; or phenoxy resins are preferably chosen for polycarbonate products and blends thereof. If compatibilizing agents are used, they are preferably present in a concentration ranging between about 1% and about 5% by weight; with between about 2% and about 3% by weight being more preferred.

Without being bound to any theory, it is believed that the chemical additive(s) interacts with reactive hydroxyl or carboxylic groups present in the deleterious surface material to form a polymer compatibilizer.

Contact with the attritive environment occurs in a manner which ensures intimate mixture between the attritive environment and the polymeric regrind particles from which the deleterious surface is to be removed. Generally, this is accomplished by mechanical agitation in a suitable agitation device. The speed and intensity of agitation is that necessary to promote removal of the deleterious surface from the polymeric regrind particles with minimal degradation or erosion of the polymeric substrate. Agitation can be achieved by gaseous fluidization of the liquid medium containing the polymeric regrind particles, by mechanical agitation such as by stirring or by a combination of both. Preferably, effective agitation can be accomplished by stirring at agitation speeds which are sufficient to promote attrition of the deleterious surface without causing particles to be embedded in the surface of the plastic. It can be generally appreciated that agitation at such levels is generally a moderate to high level of agitation.

In the preferred embodiment, the agitation device is a high shear agitator which allows a level of mixing intensity sufficient to keep all "floating" particles in motion, otherwise they are stagnant and do not enter the zone of the high shear agitator. The rate of paint removal generally depends on mixing intensity. Mixing intensity is defined by power per unit volume. Defining units, this is $kW/m^3$ or HP/1,000 gallons. The levels found effective will depend on vessel size, geometry, mean particle size, agent quality, and the difference in density between solid and liquid. In the preferred embodiment, a reactor with a high shear disk blade agitator may be used, as described in Example II below. Rushton turbines may also be used. The mixing intensity preferably ranges between about 3 HP/1,000 gallon and about 12 HP/1,000 gallon; or between about 0.6 $kW/m^3$ and about 3 $kW/m^3$.

In the process of the present invention, the attritive environment generally has a total solids content inclusive of polymeric regrind particles of between about 25% and 45% by volume. The maximum solids value is generally limited by material handling considerations such as pumpability. It has been found that maximizing solids levels increases the efficiency and effectiveness of the attritive environment.

In the process of the present invention, polymeric regrind particles having deleterious surfaces are brought into abrasive contact with one another in an attritive environment which promotes the gradual removal of the deleterious surface from contact with the polymeric substrate of the particle and prevents the removed deleterious surface material from redepositing on the substrate.

Since typical polymeric regrind particles do not have deleterious surface material on all faces, it is believed that removal of the deleterious surfaces commences at the exposed interface between the deleterious surface and the underlying polymeric substrate and proceeds from that point inward. Continued particle to particle impact and collision serves to degrade the deleterious surface itself and its connection to the underlying polymeric substrate. This is particularly pronounced at the exposed surface-to-substrate contact region. Continued impact and collision works at the exposed contact regions to incrementally erode the deleterious surface material. With each incremental erosion, new surface to substrate contact region is exposed and made vulnerable to the process.

In the process of the present invention, satisfactory levels of deleterious surface removal can be accomplished on certain plastic substrates by agitation in the attritive environment without the addition of bond strength reducers such as hydrolyzing agents and/or solvent swellers. Regrind material particularly amenable to an agitation process alone includes thermoplastic polymeric materials such as polycarbonate or blends thereof. In situations where the regrind material produced will not be used in applications in which surface imperfections can be tolerated or in which the finished part will not experience extensive shock loads, it is expected that agitation in an attritive environment at moderate to moderately high levels of agitation will adequately remove sufficient amounts of the deleterious surface to provide a suitable plastic regrind. Moderate to moderately high agitation speeds are difficult to accurately define, however for processing purposes, it is generally defined herein as speeds greater than about 500 rpm.

Mechanical bond strength reducers and solvent swellers can also be employed in situations in which the deleterious surface is highly adhered and relatively rapid removal of the surface is desired. In such circumstances, it has been discovered that regrind particles exposed to the attritive environment including additives such as mechanical bond strength reducers and solvent swellers experienced higher levels of deleterious surface removal at lower agitation levels than previously predicted. Exposure to such agents is also advantageously employed when it is anticipated that the polymeric regrind particles will be exposed to compatibilizing agents in post-attrition processing steps.

Since exposure to the attritive environment and mechanical bond strength reducers includes more moderate agitation of the regrind particles, the mechanical action does not result in pulverization or appreciable fracture of the regrind particles. Additionally, the erosive nature of the attritive environment is tempered by the nature of its solids content. In general, the solids content of the attritive environment is composed of between about 20% and about 40% by volume regrind particles. Thus, the mechanical action which occurs in the attritive environment is due, in large part, to particle-to-particle interactions which tend to produce wear on the polymeric substrate itself.

In the process of the present invention, elevated temperatures may be employed in the attritive environment in order to further promote removal of the deleterious surface from the polymeric regrind particles.

The process of the present invention preferably proceeds at temperatures below the degradation temperatures for the polymeric substrate material. The process temperature will vary depending upon the thermoplastic substrate processed. The process temperature generally can be in a range between about 25° C. and about 100° C. In situations in which the thermoplastic substrate to be processed is a polycarbonate or polycarbonate alloy, it is anticipated that the process temperature will be between about 50° C. and about 70° C. In situations in which the thermoplastic substrate to be processed is a TPO, the process temperature can be between about 75° C. and about 90° C. without degradation.

The deleterious surface which can be effectively removed by the process of the present invention generally has a thickness less than 5 mil with a surface thickness between about 2–3 mil being optimum.

Without being bound by any theory, it is believed that the removal of the deleterious surface from the regrind particle by the process of the present invention generally proceeds from the edge of the particle inward. The deleterious surface is slowly worn away until only a small spot, if any, is visible to the naked eye, usually on or about the middle of the surface of the regrind particle. Further treatment substantially completely erodes the deleterious surface. At this point, the regrind particle is recovered from the attritive environment by filtration through a large mesh screen or may be separated by density or floatation. The particles are washed with an aqueous medium such as pure water to remove any excess hydrolyzing solution which remains. The particles can then be dried and repellitized.

To determine if the present inventive process has sufficiently removed enough and/or all of the deleterious surface material, the following test may be performed. A sample weight of regrind particles or chips is removed from the reactor. Each particle is visually inspected for residual deleterious surface. The sample regrind particles are then separated into those having residual deleterious surface visible to the eye and those which do not appear to have any residual deleterious surface. The particles in each group are counted, and a relative number or ratio is calculated. If less than about 10% of the sample has any residual deleterious surface, the reaction is considered complete (between about 80% and about 90% of untreated polymeric regrind particles generally have deleterious surface thereon). If more than about 10% of the sample particles have residual deleterious surface, then the reaction may be continued for a predetermined length of time.

Materials such as the mechanical bond strength reducers employed in the attritive environment can be further processed to remove undesirable deleterious surface material remaining therein. This can be accomplished by any suitable procedure such as filtration, centrifugation or the like. The fluid can then be reprocessed for further use in the process of the present invention. The separated material can be recycled for reuse without any appreciable loss of activity with regard to the process of the present invention.

The amount of time during which the regrind particles reside in the attritive environment will depend upon various factors; among these are the initial size of the regrind particles, process temperature, thickness of the deleterious surface to be removed and the presence or nature of any chemical additives. The reaction time is generally determined to be that necessary to achieve removal of the deleterious surface. In general, when regrind particles having a size below approximately ½" are employed, the reaction time is between about 3 hours and about several days, depending upon economic considerations.

To further illustrate the composition, the following examples are given. It is to be understood that these examples are provided for illustrative purposes and are not to be construed as limiting the scope of the present invention.

EXAMPLE I

Defective painted injection molded parts consisting of automotive bumpers, fascias, etc. formed from various thermoplastics are granulated. A first portion of this material (referred to as painted regrind) is separated and is then extruded, pelletized and molded for physical property testing according to the methods outlined in Table I. The physical properties of the material were determined and are collected in Table II.

EXAMPLE II

A second portion of the painted regrind material discussed in Example I is subjected to the following process to remove a majority of the paint adhering thereto.

A fifty-gallon stainless steel reactor, 2 feet in diameter, 3½ feet high, with (4) 2 inch baffles, was equipped with a heater and a high shear disk blade agitator. The diameter of the blade should be preferably between about 25% and about 40% of the vessel diameter. This reactor was used also used in relevant Examples hereinbelow. The reactor was loaded with painted regrind and a dilute aqueous solution of sodium hydroxide. Specifically, 150 pounds (approximately 34% by volume of reactor charge) of painted TPO regrind plus 250 pounds water and 44 pounds (15% aqueous phase) of sodium hydroxide were added to the reactor. The reactor contents were heated to 85° C. while agitating at high speed (520 rpm), with a mixing intensity ranging between about 3 HP/1,000 gallon and about 12 HP/1,000 gallon; or between about 0.6 kW/m$^3$ and about 3 kW/m$^3$. Samples were withdrawn periodically and the particles of regrind were examined using an optical microscope to observe paint remaining on the regrind particles.

Examination after about 6 hours indicated that the paint at the edges of the particle had started to erode or wear away. Examination after further reaction showed progressive erosion of the paint until only a small dot of paint remained near the center of the regrind surface. The reaction was allowed to proceed until the remainder of the paint was removed. At that point the reaction was shut down after a total reaction time of 20–24 hours.

At this point, 25 randomly selected processed regrind particles were removed and visually compared with 25 randomly selected untreated particles. It was qualitatively determined, by the method mentioned hereinabove, that less than 10% of the original paint remained on the processed particles.

After 20 hours of process, the paint-stripped regrind particles were separated from the caustic solution by filtration through a ⅛" mesh screen. The caustic solution was disposed of. The filtered regrind material was washed with water to remove excess caustic. This process was repeated several times, and the final wash was acidified to a pH of between 6 and 7. The product was recovered by filtration and dried. Finally, a portion of the paint stripped regrind was extruded, pelletized and molded. Physical properties were determined and were very similar to the virgin plastic as shown in Table I.

The key physical property monitored to evaluate process effectiveness was examination of the regrind particles for residual paint over the course of the reaction (both colored paint and tie coat), see FIGS. 1A–1D.

EXAMPLES III–VI

Regrind particles were obtained from granulated bumpers containing thermoplastic polyolefin (TPO), specifically impact-modified polypropylene. A portion of painted TPO regrind was processed according to the procedure generally outlined in Example II. The process temperature was increased to 90° C. to 100° C. Separate portions of painted regrind were processed modifying variables such as average particle size, agitation speed and solids level. Process progress was monitored by periodic visual examination of particles under a stereo optical microscope.

In each of the samples processed, the coating on the TPO regrind particles consisted of a colored top coat and a black undercoat (tie coat). The process of paint removal was similar to that followed in the process outlined in Example II. The colored top coat was attrited first and then the undercoat was removed. Attrition appeared to begin as a wearing away from the edge of each particle and progressed to the center.

A comparison of the physical properties for both painted regrind and processed product in which the paint has been stripped indicates that both materials exhibit suitable and similar physical properties such as elongation melt flow rate, tensile strength, flexural modules etc., since the basic problem presented in recycling painted TPO is surface imperfection created by paint particles. Thus, the chief determination of process performance for TPO regrind material was surface examination of particles for residual paint or tie coat.

A first portion of painted TPO regrind designated B-1 was processed according to the parameters outlined in Table III. All apparent paint and tie coat was removed after processing for 20 hours at high agitation (520 rpm), 90° C. and 15% NaOH with a solids content of 34%.

In order to determine the effect of solids content on process effectiveness, a second portion of painted TPO regrind designated B-2 was processed as outlined above in which the total solids content was reduced to 10%. After a run time of 28 hours, visual inspection indicated that while most paint had been removed, substantially all of the tie coat remained.

A third portion of painted TPO designated B-3 was processed as outlined previously in which a solids content of 34% was processed at low speed agitation (370 rpm). After processing for 48 hours, samples of randomly selected particles were visually inspected under a stereo optic microscope. Most of the paint was removed from the particles viewed. However, the tie coat was essentially unaffected.

A fourth run designated B-4 was conducted under low speed agitation (370 rpm) at 34% solids content, 15% NaOH and 90° C. process temperature in which the average size of the painted regrind particle was ⅜ inch. To this reaction mixture, 10–1×2 inch painted TPO bumper pieces were added. After 24 hours, the ⅜ inch particles had all paint removed therefrom. The 1×2 inch pieces still had a majority of paint remaining thereon. The 1×2 inch pieces were recovered, and added to several other subsequent batches until it was observed that most of the paint was removed. After 4 batches, some paint still remained on the 1×2 inch pieces.

EXAMPLE VII

Samples of regrind polymer were processed for 0, 6 and 12 hours according to the process outlined in Example II. At the specified intervals, a portion of the painted regrind was removed from the reactor, washed, dried. The removed material was separated into two portions. Each portion was extruded; one portion as is, and one portion with 5% maleated polypropylene. The 6 hour sample of regrind had about 80% of the paint remaining. The 12 hour sample had about 50% of the paint remaining. The pellets were injection molded and tested using standard notched Izod test methods.

The fracture surfaces were photographed at 40× magnification.

Figure 2A:
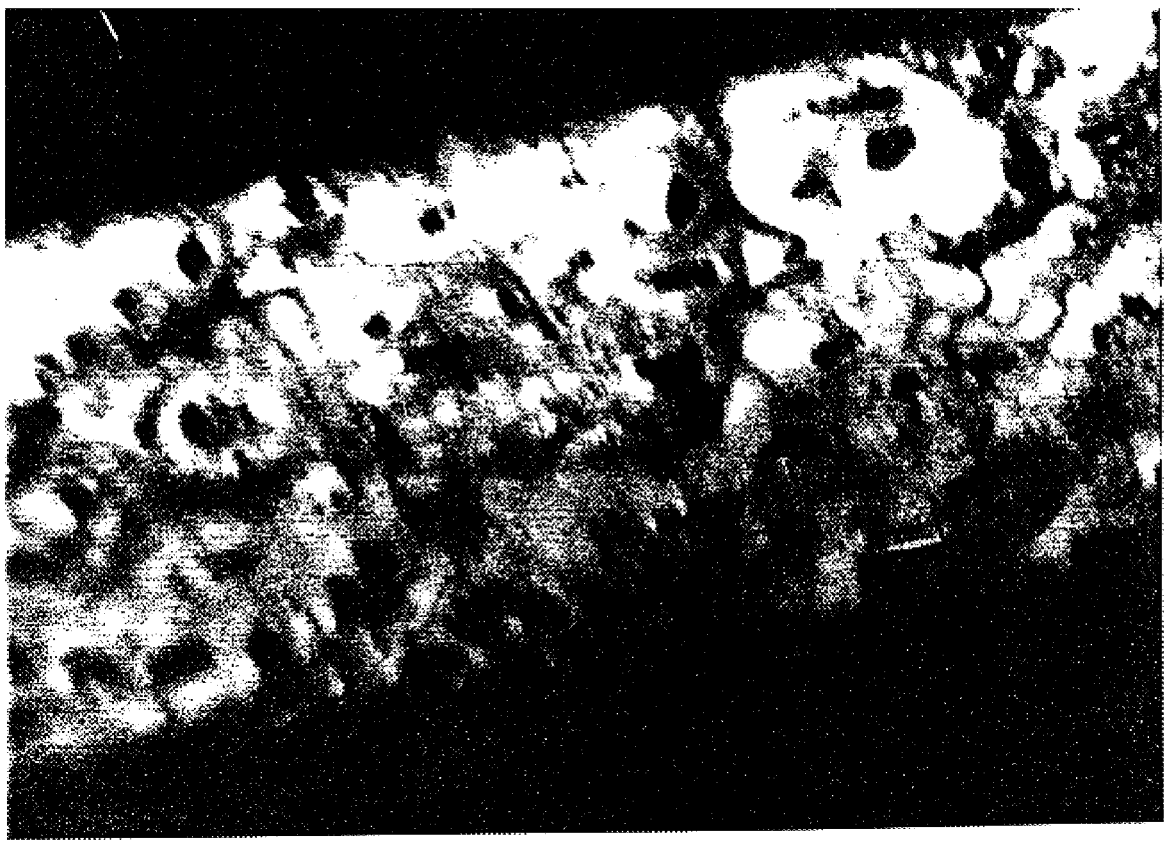
FIG. 2A is a close up at 40× power of a fracture surface with no processing and no additive.
Figure 2B:
FIG. 2B is a close up at 40× power of a fracture surface with no processing and the use of additive.

FIG. 2A is a fracture surface with no processing and no additive. FIG. 2B is a fracture surface with no processing and the use of additive.

Figure 3A:
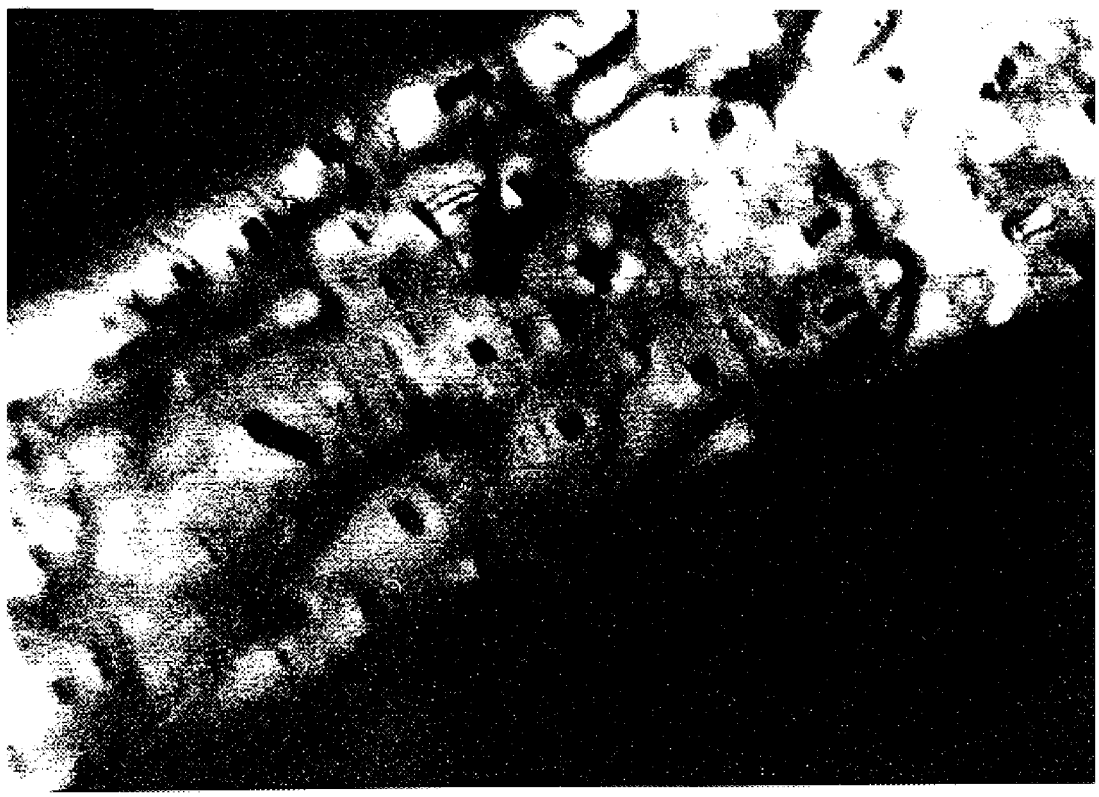
FIG. 3A is a close up at 40× power of a fracture surface with 6 hours of processing according to the method of the present invention.
Figure 3B:
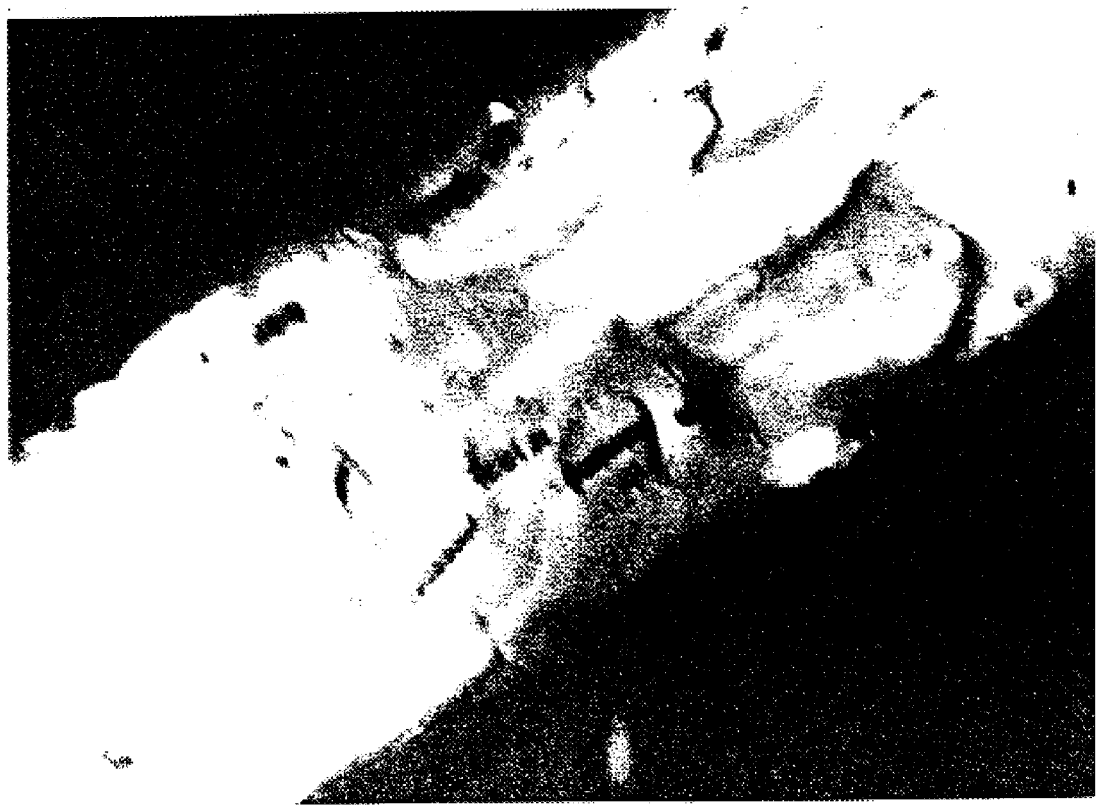
FIG. 3B is a close up at 40× power of a fracture surface after 6 hours of processing according to the method of the present invention and the use of additive.

FIG. 3A is a fracture surface with 6 hours of processing according to the method of the present invention. FIG. 3B is a fracture surface after 6 hours of processing and the use of additive.

Figure 4A:
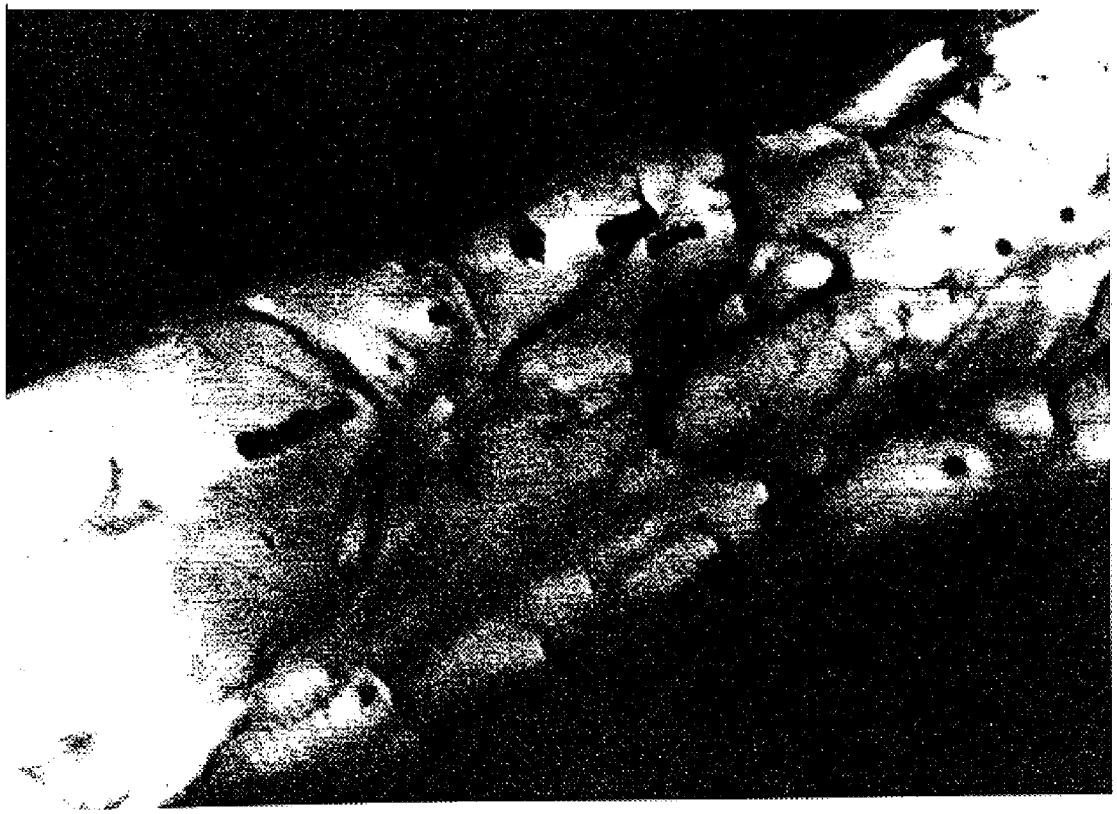
FIG. 4A is a close up at 40× power of a fracture surface after 12 hours of processing according to the method of the present invention.
Figure 4B:
FIG. 4B is a close up at 40× power of a fracture surface after 12 hours of processing according to the method of the present invention and the use of additive.

FIG. 4A is a fracture surface after 12 hours of processing according to the method of the present invention. FIG. 4B is a fracture surface after 12 hours of processing and the use of additive.

The effect of maleated polypropylene can be seen from the photographs. The use of the additive resulted in more complete redispersal of paint in all samples. Additive plus prolonged processing produced a sample in which only a few very small specks of paint were visible on the fracture surface which indicated more efficient redispersal of the paint particles.

EXAMPLE VIII

The paint removal process described in Example I was also applied to regrind particles from Ford Motor Company painted bumpers produced with XENOY (a polycarbonate/polybutylene terephthalate blend produced by General Electric). The reaction conditions for the 50 gallon reactor that were optimum for the painted TPO materials (15% NaOH, 90° C., 520 rpm, with high shear blade agitation, with a mixing intensity ranging between about 3 HP/1,000 gallon and about 12 HP/1,000 gallon; or between about 0.6 kW/m$^3$ and about 3 kW/m$^3$) were evaluated. It was found that the paint was removed in a manner similar to the TPO materials. That is, after a short period of time (one hour), the paint started to be eroded from the edges of the particles and proceeded to the center leaving a small dot which disappeared upon further processing. The attribution of erosion process discovered in removing paint from TPO appeared to also be operative in removing paint from PC/PBT. However, the paint was removed from the PC/PBT particle much more rapidly than the painted TPO. At the optimum TPO paint removal conditions, the paint was completely removed from post consumer painted PC/PBT particles in 3 hours. The caustic solution began to thicken and it was obvious that the PC/PBT particles were being degraded. Some of the paint stripped PC/PBT particles were recovered, washed, acidified to pH 7, dried and the melt flow rate was determined using condition ASTM D1238 (g/10 minutes). The melt flow rate was 74.6 versus 30.6 for the original material, indicating significant degradation of the PC/PBT. In experiment 2, the paint hydrolysis conditions were changed to 15% NaOH, 65° C., and 520 rpm agitation speed. At these conditions, the paint was completely removed in 18–20 hours and the melt flow rate was 30 gm/10 min., same as the original painted regrind. The product was recovered, washed, pH adjusted to 5 to 7, dried, molded and physical properties were measured. (See Table III)

The critical property required for PC/PBT is toughness. The key indicator is tensile elongation. It is clear that product subjected to this paint stripping process has been significantly improved—elongation increased from approximately 17–25% for painted regrind to 60–70% for paint stripped product.

EXAMPLE IX

A portion of the paint stripped regrind from above was mixed with a blend of a multifunctional epoxy resin (IGETABOND from Sumitoma Chemical Co) and a rubber toughener (BLENDEX from Rohm & Haas), a ratio of 1 part igetabond to 4 parts blendex was used. Three percent of the above mix was added to the portion of the product in Example VIII. These were then re-extruded, molded and physical properties measured. The tensile elongation increased to 141–154 which is equivalent to virgin resin. This is a highly recyclable product.

EXAMPLE X

Finally, an experiment using just very high agitation and no paint hydrolyzing agent was run, that is, a lab reactor with very high intensity mixer head manufactured by Morehouse-Cowles was evaluated to remove paint from PC/PBT. A 4 gal. reactor was charged with 12 pounds of painted post industrial PC/PBT and 10.4 pounds of water. The mixture was agitated at 1900 rpm at approximately 70° C. for 16 hours at which time on the PC/PBT paint stripped regrind particles which were recovered by filtration through a coarse screen, washed and dried. Eleven pounds of the PC/PBT paint stripped were recovered (8% attrited material was disposed of)

It is clear from all of the above examples that paint can be removed from the potential recyclable plastic by a very intense agitation, or the coating can be treated with a hydrolyzing agent or solvent to reduce the mechanical strength of the coating to facilitate removal. The optimum combination of mechanical energy and chemical energy to remove the coating will depend upon the recycling objective, i.e., minimizing costs and optimizing recycle product performance. It is also clear that trace amounts of the coating may remain in the recyclable plastic and it may be necessary to add various materials to restore the plastic to its original state. These additives will depend on the particular plastic being recycled and, in general, are thought to be materials partially miscible with the recycled plastic and containing functionability substantive to the coating, or partially degraded coating. These additives then are thought to function as polymeric surfactants helping to disperse the regrind paint and minimize the deleterious effect of the coating particle on toughness or plastic surface quality.

TABLE I

TPO PROPERTIES

| TEST | ASTM | VIRGIN | PAINTED EXTRUDED PELLETIZED | PAINT STRIPPED |
|---|---|---|---|---|
| Melt Flow | D-1238 g/10 min. | 8.5 | N/A | 8.2 |
| Tensile strength | D-638 psi | 2760 | 2593 | 2792 |
| Yield Elongation | D-638 % | >800 | 780 | >800 |
| Flexural Modulus | D-790 psi | 116,000 | 120,700 | 117,300 |
| Notched Izod | D-256 ft-lb/in | N/B | N/B | N/B |
| Surface Quality | | Excellent | Poor | Excellent |

TABLE II

EFFECT OF PROCESS VARIABLES ON TPO REGRIND PAINT REMOVAL

| RUN # | % NAOH | SOLIDS CONTENT (VOL %) | TEMPERATURE (° C.) | AGITATOR SPEED (RPM) | PARTICLE SIZE (INCHES) | OBSERVATION |
|---|---|---|---|---|---|---|
| B-1 | 15 | 34 | 90 | 520 | 3/8 | Paint and tie coat removed in 20 hrs. |
| B-2 | 15 | 10 | 90 | 520 | 3/8 | Most paint removed all tie coat remaining after 28 hrs. |

TABLE II-continued

EFFECT OF PROCESS VARIABLES ON TPO REGRIND PAINT REMOVAL

| RUN # | % NAOH | SOLIDS CONTENT (VOL %) | TEMPERATURE (° C.) | AGITATOR SPEED (RPM) | PARTICLE SIZE (INCHES) | OBSERVATION |
|---|---|---|---|---|---|---|
| B-3 | 15 | 34 | 90 | 370 | 3/8 | Most paint removed, all tie coat remaining after 48 hrs. |
| B-4 | 15 | 34 | 90 | 370 | 3/8 (+ 1 × 2 inch pieces) | Some paint still remaining on 1 × 2 inch pieces after 96 hrs. |

TABLE III

COMPARISON OF PHYSICAL PROPERTIES OF VARIOUS PC/PBT MATERIALS

| MATERIAL(S) | ASTM (Units) | UNPROCESSED PAINTED REGRIND RESIN W/O ADDITIVES | PROCESSED PAINTED REGRIND RESIN | | VIRGIN RESIN |
|---|---|---|---|---|---|
| | | | EXAMPLES VIII W/O ADDITIVES | EXAMPLE IX W/ADDITIVES | |
| Melt Flow | D-1238 g/10 min | 21.0 | 18.7 | 12.9 | 18 |
| Tensile Strength | D-639 (psi) | 7300 | 7267 | 6788 | 7900 |
| Yield Elongation | D-638 (%) | 24 | 60 | 154 | 150–300 |
| Flexural Modulus | D-790 (psi) | 275,000 | 288,000 | 276,000 | 285,000 |
| Notched Izod | D-256 (ft-lb/in) | 12.7 | 13.3 | 12.5 | 15.0 |

In addition to other advantages stated herein, the present inventive process as described hereinabove is particularly advantageous in that it can economically remove deleterious surface, such as paint, from polymeric regrind particles for about 10 cents per pound.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A process for removing deleterious surfaces from polymeric regrind particles comprising the steps of:
    treating polymeric regrind particles, the polymeric regrind particles composed of a solid substrate and a surface material deleterious to post-treatment processes attached to an outer surface of the substrate, the polymeric regrind material being treated in an attritive environment for an interval sufficient to accomplish substantial removal of said deleterious surface material from contact with polymeric regrind particulate substrate material with consequent removal of less than about 10% of total mass of polymeric regrind particulate substrate, wherein the attritive environment comprises an aqueous fluid medium which undergoes high shear agitation and is a medium for conveying mechanical agitative energy to the polymeric regrind particles introduced into the attritive environment, and wherein the polymeric regrind particles within the attritive environment are subjected to mechanical energy imparted by a mixing intensity greater than about 3 HP/1000 gallon;
    separating polymeric regrind particulate substrate from the attritive environment while retaining removed dissociated deleterious surface material within the attritive environment.

2. The process of claim 1 wherein the attritive environment further comprises inorganic chemical additives which interact with the deleterious surface to facilitate the removal process.

3. The process of claim 2 wherein the chemical additive is a hydrolyzing agent present in an amount sufficient to reduce at least one of mechanical strength and adhesion between the deleterious surface and the regrind particulate substrate, wherein the hydrolyzing agent is a strong base selected from the group consisting of sodium hydroxide, potassium hydroxide, trisodium phosphate, disodium phosphate, and mixtures thereof.

4. The process of claim 1, further comprising the step of melt processing separated polymeric regrind particulate substrate with the addition of a chemical additive, wherein the chemical additive is a compound which interacts with attrited surface material, compatibilizing the attrited material with the polymeric substrate, the chemical compatibilizing additive selected from the group consisting of polymeric materials at least partially miscible and compatible with the polymeric regrind particulate material and functional groups reactive with residual paint or hydrolyzed paint.

5. The process of claim 4 wherein the compatibilizing additive consists essentially of at least one of polymers having epoxy functionalities selected from the group consisting of interpolymers of glycidyl methacrylate, methyl methacrylate, ethylene, and mixtures thereof; and phenoxy resins with terminal epoxy groups.

6. The process of claim 4 wherein the compatibilizing additive consists essentially of functionalized polypropylene reacted with maleic anhydride or norbornene-2,3-dicarboxylic anhydride.

7. The process of claim 1 wherein the deleterious surface material is a paint.

8. The process of claim 1 wherein the regrind polymeric substrate is a thermoplastic material selected from the group consisting of thermoplastic polyolefins, alloys of polycarbonate and acrylonitrile-butadiene-styrene copolymers, alloys of polycarbonate and polyethylene terephthalate, alloys of polyamide and polyphenylene oxide, alloys of polyamide and polypropylene, alloys of polycarbonate and polyethylene terephthalate, alloys of polycarbonate and polybutylene terephthalate, polyamides, acrylonitrile-butadiene-styrene copolymers, acrylonitrile-butadiene-styrene homopolymers, polystyrene, high impact polystyrene, polypropylene, and mixtures thereof.

9. A process for removing paint from the outer surface of polymeric regrind particles composed of a reprocessible polymeric substrate, comprising the steps of:
    treating polymeric regrind particles, the polymeric regrind materials composed of a solid substrate and paint adhering to outer surface of the substrate, the polymeric regrind material being treated in an attritive environment for an interval sufficient to accomplish substantial dissociation of said paint from contact with the polymeric substrate with accompanying removal of less than about 10% of total mass of polymeric substrate, the attritive environment consisting essentially of an aqueous solution undergoing high shear agitation, the aqueous solution containing between about 10% and about 20% by volume of an inorganic hydrolyzing agent, wherein said attritive environment has a solids content of between about 20% and about 45% by volume inclusive of said polymeric regrind particles and wherein the attritive environment is a medium for conveying mechanical energy to the polymeric regrind particles treated therein, and wherein the polymeric regrind particles treated within the attritive environment are subjected to mechanical energy imparted by a mixing intensity greater than about 3 HP/1000 gallon;

after dissociation from said paint, separating polymeric substrate from the attritive environment and retained dissociated paint material.

10. The process of claim 9 wherein said contacting step occurs at an elevated temperature below a temperature at which degradation of the polymeric regrind particulate substrate would occur.

11. The process of claim 9 wherein the polymeric regrind particles to be processed have an average particle size less than about one half inch and the paint to be removed has a thickness less than about 5 mil.

12. The process of claim 9 wherein the paint coating overlaying the polymeric substrate is selected from the group consisting of polyester or polyacrylate cross-linked with polyurethane, and polyester/polyacrylate copolymers cross-linked with melamine formaldehyde; and the polymeric substrate is selected from the group consisting of thermoplastic polyolefins, alloys of polycarbonate and acrylonitrile-butadiene-styrene copolymers, alloys of polycarbonate and polyethylene terephthalate, alloys of polyamide and polyphenylene oxide, alloys of polycarbonate and polyethylene terephthalate, alloys of polycarbonate and polybutylene terephthalate, polyamides, acrylonitrile-butadiene-styrene copolymers, acrylonitrile-butadiene-styrene homopolymers, polystyrene, high impact polystyrene, and polypropylene.

13. The process of claim 9 wherein the hydrolyzing agent contained in the attritive environment is selected from the group consisting of aqueous sodium hydroxide, potassium hydroxide, trisodium phosphate, disodium phosphate, and mixtures thereof.

14. The process of claim 13, further comprising the step of melt processing separated polymeric regrind particulate substrate with the addition of a chemical additive, wherein the chemical additive is a compound which interacts with attrited surface material, compatibilizing the attrited material with the polymeric substrate, the compatibilizing additive selected from the group consisting of maleated polypropylenes, polymeric epoxy resins, and mixtures thereof, the compatibilizing additive present in an amount sufficient to interact with paint having hydroxyl functionalities to render the paint compatible with the polymeric substrate during post treatment process steps.

15. The process of claim 14 wherein the maleated polypropylene is selected from the group consisting of functionalized polyolefins compatible with polypropylene.

16. The process of claim 14 wherein the polymeric epoxy resin is selected from the group consisting of glycidyl methacrylate interpolymers or other epoxide resins compatible with polycarbonate polymers or blends.

17. A process for removing deleterious surfaces from polymeric regrind particles comprising the steps of:

treating polymeric regrind particles, the polymeric regrind particles composed of a solid substrate and a surface material deleterious to post-treatment processes attached to an outer surface of the substrate, the polymeric regrind material being treated in an attritive environment for an interval sufficient to accomplish substantial removal of said deleterious surface material from contact with polymeric regrind particulate substrate material with consequent removal of less than about 10% of total mass of polymeric regrind particulate substrate, wherein the attritive environment comprises an aqueous fluid medium which undergoes high shear agitation and is a medium for conveying mechanical agitative energy to the polymeric regrind particles introduced into the attritive environment, and wherein the polymeric regrind particles within the attritive environment are subjected to mechanical energy imparted by a mixing intensity between about 3 HP/1000 gallon and about 12 HP/1000 gallon;

separating polymeric regrind particulate substrate from the attritive environment while retaining removed dissociated deleterious surface material within the attritive environment.

18. The process of claim 17 wherein the attritive environment further comprises inorganic chemical additives which interact with the deleterious surface to facilitate the removal process, wherein the chemical additive is a hydrolyzing agent present in an amount sufficient to reduce at least one of mechanical strength and adhesion between the deleterious surface and the regrind particulate substrate, wherein the hydrolyzing agent is a strong base selected from the group consisting of sodium hydroxide, potassium hydroxide, trisodium phosphate, disodium phosphate, and mixtures thereof.

19. The process of claim 17, further comprising the step of melt processing separated polymeric regrind particulate substrate with the addition of a chemical additive, wherein the chemical additive is a compound which interacts with attrited surface material, compatibilizing the attrited material with the polymeric substrate, the chemical compatibilizing additive selected from the group consisting of polymeric materials at least partially miscible and compatible with the polymeric regrind particulate material and functional groups reactive with residual paint or hydrolyzed paint.

20. The process of claim 17 wherein the compatibilizing additive consists essentially of at least one of polymers having epoxy functionalities selected from the group consisting of interpolymers of glycidyl methacrylate, methyl methacrylate, ethylene, and mixtures thereof; and phenoxy resins with terminal epoxy groups.

21. The process of claim 19 wherein the compatibilizing additive consists essentially of functionalized polypropylene reacted with maleic anhydride or norbornene-2,3-dicarboxylic anhydride.

22. The process of claim 17 wherein said deleterious surface material is a paint, and wherein the polymeric regrind particulate substrate is a thermoplastic material selected from the group consisting of thermoplastic polyolefins, alloys of polycarbonate and acrylonitrile-butadiene-styrene copolymers, alloys of polycarbonate and polyethylene terephthalate, alloys of polyamide and polyphenylene oxide, alloys of polyamide and polypropylene, alloys of polycarbonate and polyethylene terephthalate, alloys of polycarbonate and polybutylene terephthalate, polyamides, acrylonitrile-butadiene-styrene copolymers, acrylonitrile-butadiene-styrene homopolymers, polystyrene, high impact polystyrene, polypropylene, and mixtures thereof.

23. A process for removing paint from the outer surface of polymeric regrind particles composed of a reprocessible polymeric substrate, comprising the steps of:

treating polymeric regrind particles, the polymeric regrind materials composed of a solid substrate and paint adhering to outer surface of the substrate, the polymeric regrind material being treated in an attritive environment for an interval sufficient to accomplish substantial dissociation of said paint from contact with the polymeric substrate with accompanying removal of less than about 10% of total mass of polymeric substrate, the attritive environment consisting essentially of an aqueous solution undergoing high shear agitation, the aqueous solution containing between about 10% and about 20% by volume of an inorganic hydrolyzing agent, wherein said attritive environment has a solids content of between about 20% and about 45% by volume inclusive of said polymeric regrind particles and wherein the attritive environment is a medium for conveying mechanical energy to the polymeric regrind particles treated therein, and wherein the polymeric regrind particles treated within the attritive environment are subjected to mechanical energy imparted by a mixing intensity between about 3 HP/1000 gallon and about 12 HP/1000 gallon;

after dissociation from said paint, separating polymeric substrate from the attritive environment and retained dissociated paint material.

24. The process of claim 23 wherein said contacting step occurs at an elevated temperature below a temperature at which degradation of the polymeric regrind particulate substrate would occur.

25. The process of claim 23 wherein the polymeric regrind particles to be processed have an average particle size less than about one half inch and the paint to be removed has a thickness less than about 5 mil.

26. The process of claim 23 wherein the paint coating overlaying the polymeric substrate is selected from the group consisting of polyester or polyacrylate cross-linked with polyurethane, and polyester/polyacrylate copolymers cross-linked with melamine formaldehyde; and the polymeric substrate is selected from the group consisting of thermoplastic polyolefins, alloys of polycarbonate and acrylonitrile-butadiene-styrene copolymers, alloys of polycarbonate and polyethylene terephthalate, alloys of polyamide and polyphenylene oxide, alloys of polycarbonate and polyethylene terephthalate, alloys of polycarbonate and polybutylene terephthalate, polyamides, acrylonitrile-butadiene-styrene copolymers, acrylonitrile-butadiene-styrene homopolymers, polystyrene, high impact polystyrene, and polypropylene.

27. The process of claim 23 wherein the hydrolyzing agent contained in the attritive environment is selected from the group consisting of aqueous sodium hydroxide, potassium hydroxide, trisodium phosphate, disodium phosphate, and mixtures thereof.

28. A process for preparing polymeric regrind particles comprising the step of:

removing paint from the outer surface of polymeric regrind particles composed of a reprocessible polymeric substrate, the removal process including the steps of:

contacting polymeric regrind particles having paint adhering to the outer surface of the particles in an attritive environment for an interval sufficient to accomplish dissociation of said paint from contact with the reprocessible polymeric substrate with accompanying removal of less than about 10% of total mass of polymeric substrate, the attritive environment consisting essentially of an aqueous solution containing between about 10% and about 20% by volume of an inorganic hydrolyzing agent selected from the group consisting of aqueous sodium hydroxide, potassium hydroxide, trisodium phosphate, disodium phosphate, and mixtures thereof, wherein said attritive environment has a solids content of between about 20% and about 45% by volume inclusive of said polymeric regrind particles, wherein the polymeric regrind particles within the attritive environment are subjected to a mixing intensity of between about 3 HP/1,000 gallon and about 12 HP1,000 gallon; or between about 0.6 kW/m$^3$ and about 3 kW/m$^3$; and after dissociation from said paint, separating polymeric substrate from the attritive environment and retained dissociated paint material.

29. The process of claim 28 wherein the polymeric regrind particles to be processed have an average particle size less than about one half inch and the paint to be removed has a thickness less than about 5 mil.

30. A process for preparing polymeric regrind particles comprising the step of:

removing paint from the outer surface of polymeric regrind particles composed of a reprocessible polymeric substrate, the removal process including the steps of:

contacting polymeric regrind particles having paint adhering to the outer surface of the particles in an attritive environment for an interval sufficient to accomplish dissociation of said paint from contact with the reprocessible polymeric substrate with accompanying removal of less than about 10% of total mass of polymeric substrate, the attritive environment consisting essentially of an aqueous solution containing between about 10% and about 20% by volume of an inorganic hydrolyzing agent selected from the group consisting of aqueous sodium hydroxide, potassium hydroxide, trisodium phosphate, disodium phosphate, and mixtures thereof, wherein said attritive environment has a solids content of between about 20% and about 45% by volume inclusive of said polymeric regrind particles, wherein the polymeric regrind particles within the attritive environment are subjected to a mixing intensity greater than about 0.6 kW/m$^3$; and after dissociation from said paint, separating polymeric substrate from the attritive environment and retained dissociated paint material.

* * * * *